United States Patent
Shklover (10) Patent No.: US 9,235,555 B2
(45) Date of Patent: Jan. 12, 2016

(54) COMPUTING POLYCHORIC AND POLYSERIAL CORRELATIONS BETWEEN RANDOM VARIABLES USING NORTA

(71) Applicant: International Business Machines Corporation, Armonk, NY (US)

(72) Inventor: Vladimir E. Shklover, Skokie, IL (US)

(73) Assignee: Internationl Business Machines Corporation, Armonk, NY (US)

( * ) Notice: Subject to any disclaimer, the term of this patent is extended or adjusted under 35 U.S.C. 154(b) by 365 days.

(21) Appl. No.: 13/836,674

(22) Filed: Mar. 15, 2013

(65) Prior Publication Data

US 2014/0280419 A1 Sep. 18, 2014

(51) Int. Cl.
*G06F 17/14* (2006.01)
*G06F 17/10* (2006.01)
*G06F 7/483* (2006.01)
*G06F 17/18* (2006.01)
*G06K 9/62* (2006.01)

(52) U.S. Cl.
CPC ............ *G06F 17/147* (2013.01); *G06F 7/483* (2013.01); *G06F 17/10* (2013.01); *G06F 17/18* (2013.01); *G06K 9/6215* (2013.01)

(58) Field of Classification Search
CPC ..... G06F 17/146; G06F 17/142; G06F 17/14; G06F 17/145; G06F 17/148
USPC ........................................................ 708/400
See application file for complete search history.

(56) References Cited

U.S. PATENT DOCUMENTS 6,725,210 B1 * 4/2004 Key et al. .................. 706/45

OTHER PUBLICATIONS

Niaki et al, "Generating Correlation Matrices for Normal Random Vectors in NORTA Algorthim Using Artifical Neural Networks", Journal of Uncertain Systems vol. 2, No. 3, pp. 1929-201, 2008.*
Avramidis, Athanassios N. et al. "Efficient Correlation Matching for Fitting Discrete Multivariate Distributions with Arbitrary Marginals and Normal-Copula Dependence", INFORMS Journal on Computing, Articles in Advance, 2008, pp. 1-19.
Channouf, Nabil and Pierre L'Ecuyer "Fitting a Normal Copula for a Multivariate Distribution with Both Discrete and Continuous Marginals", Proceedings of the 2009 Winter Simulation Conference, IEEE, 2009, pp. 352-358.
Chen, Huifen "Initialization for NORTA: Generation of Random Vectors with Specified Marginals and Correlations", INFORMS Journal on Computing, vol. 13, No. 4, Fall 2001, pp. 312-331.
Martinson et al., "Maximum Likelihood and some other Asymptotically Efficient Estimators of Correlation in two way Contingency Tables," J. Statist. Comput Simul. vol. 1, 1971, pp. 45-54.
Olsson et al., "The Polyserial Correlation Coefficient," Psychometrika, vol. 47, No. 3, Sep. 1982, pp. 337-347.

* cited by examiner

*Primary Examiner* — Tan Mai
(74) *Attorney, Agent, or Firm* — Shumaker & Sieffert, P.A.

(57) ABSTRACT

Polychoric correlations between two discrete random variables and polyserial correlations between a discrete random variable and a continuous random variable may be determined by using a normal-to-anything (NORTA) method and a stochastic root finding algorithm.

10 Claims, 3 Drawing Sheets

FIG. 3 ically straightforward to compute correlations between two continuous random variables based on arbitrary data samples. If both random variables are discrete, a polychoric correlation may be calculated for the two random variables. If two random variables include one discrete random variable and one continuous random variable, a polyserial correlation may be calculated for the one discrete random variable and the one continuous random variable.

SUMMARY

In one aspect, the disclosure is directed to a method for determining a polychoric correlation between a first discrete variable and a second discrete variable. The method may include if a first discrete variable is without a first known distribution, approximating a first distribution for the first discrete variable. The method may further include if a second discrete variable is without a second known distribution, approximating a second distribution for the second discrete variable. The method may further include transforming a first normally distributed variable to a first transformed variable by simulating values of the first normally distributed variable and discrete mapping from the first normally distributed variable to one of the first known distribution and the approximated first distribution for the first discrete variable based at least in part on the simulated values of the first normally distributed variable. The method may further include transforming a second normally distributed variable to a second transformed variable by simulating values of the second normally distributed variable and discrete mapping from the second normally distributed variable to one of the second known distribution and the approximated second distribution for the second discrete variable based at least in part on the simulated values of the second normally distributed variable. The method may further include determining a polychoric correlation between the first discrete variable and the second discrete variable by using a stochastic root finding algorithm to operate on the first transformed variable and the second transformed variable.

In another aspect, the disclosure is directed to a computer system for determining a polychoric correlation between a first discrete variable and a second discrete variable. The computer system may include one or more processors. The computer system may further include one or more computer-readable memories. The computer system may further include one or more computer-readable tangible storage devices. The computer system may further include program instructions stored on at least one of the one or more computer-readable tangible storage devices for execution by at least one of the one or more processors via at least one of the one or more computer-readable memories to: if a first discrete variable is without a first known distribution, approximate a first distribution for the first discrete variable; if a second

COMPUTING POLYCHORIC AND POLYSERIAL CORRELATIONS BETWEEN RANDOM VARIABLES USING NORTA

TECHNICAL FIELD

The disclosure relates to determining polychoric and polyserial correlations between random variables.

BACKGROUND

Correlations between random variables may indicate the association and/or dependency between different variables from real or simulated data. It may be relatively straightforward to compute correlations between two continuous random variables based on arbitrary data samples. If both random variables are discrete, a polychoric correlation may be calculated for the two random variables. If two random variables include one discrete random variable and one continuous random variable, a polyserial correlation may be calculated for the one discrete random variable and the one continuous random variable.

discrete variable is without a second known distribution, approximate a second distribution for the second discrete variable; transform a first normally distributed variable to a first transformed variable by simulating values of the first normally distributed variable and discrete mapping from the first normally distributed variable to one of the first known distribution and the approximated first distribution for the first discrete variable based at least in part on the simulated values of the first normally distributed variable; transform a second normally distributed variable to a second transformed variable by simulating values of the second normally distributed variable and discrete mapping from the second normally distributed variable to one of the second known distribution and the approximated second distribution for the second discrete variable based on the simulated values of the second normally distributed variable; and determine a polychoric correlation between the first discrete variable and the second discrete variable by using a stochastic root finding algorithm to operate on the first transformed variable and the second transformed variable.

In another aspect, the disclosure is directed to a computer program product for determining a polychoric correlation between a first discrete variable and a second discrete variable, the computer program product comprising a computer readable storage medium having program code embodied therewith, the program code readable/executable by at least one processor to perform a method. The method may include if a first discrete variable is without a first known distribution, approximating a first distribution for the first discrete variable. The method may further include if a second discrete variable is without a second known distribution, approximating a second distribution for the second discrete variable. The method may further include transforming a first normally distributed variable to a first transformed variable by simulating values of the first normally distributed variable and discrete mapping from the first normally distributed variable to one of the first known distribution and the approximated first distribution for the first discrete variable based at least in part on the simulated values of the first normally distributed variable. The method may further include transforming a second normally distributed variable to a second transformed variable by simulating values of the second normally distributed variable and discrete mapping from the second normally distributed variable to one of the second known distribution and the approximated second distribution for the second discrete variable based at least in part on the simulated values of the second normally distributed variable. The method may further include determining a polychoric correlation between the first discrete variable and the second discrete variable by using a stochastic root finding algorithm to operate on the first transformed variable and the second transformed variable.

In another aspect, the disclosure is directed to a method for determining a polyserial correlation between a discrete variable and a continuous variable. The method may include if a discrete variable is without a known discrete distribution, approximating a discrete distribution for the discrete variable. The method may further include if a continuous variable is without a prescribed continuous distribution, approximating a continuous distribution for the continuous variable. The method may further include if the discrete variable is with a prescribed discrete distribution, transforming a normally distributed variable that is underlying for continuous to a transformed continuous variable by simulating values of the normally distributed variable that is underlying for continuous and continuously mapping the normally distributed variable that is underlying for continuous to the prescribed discrete distribution based at least in part on the simulated values of the normally distributed variable that is underlying for continuous. The method may further include transforming a normally distributed variable that is underlying for discrete to a transformed discrete variable by simulating values of the normally distributed variable that is underlying for discrete and discrete mapping from the normally distributed variable that is underlying for discrete to one of the known discrete distribution and the approximated discrete distribution for the discrete variable based at least in part on the simulated values of the normally distributed variable that is underlying for discrete. The method may further include determining a polyserial correlation between the discrete variable and the continuous variable by using a stochastic root finding algorithm to compute a correlation between underlying normal distributions of the transformed discrete variable and one of the continuous variable having the approximated continuous distribution and the transformed continuous variable.

In another aspect, the disclosure is directed to a computer system for determining a polyserial correlation between a discrete variable and a continuous variable. The computer system may include one or more processors. The computer system may further include one or more computer-readable memories. The computer system may further include one or more computer-readable tangible storage devices. The computer system may further include program instructions stored on at least one of the one or more computer-readable tangible storage devices for execution by at least one of the one or more processors via at least one of the one or more computer-readable memories to: if a discrete variable is without a known discrete distribution, approximate a discrete distribution for the discrete variable; if a continuous variable is without a prescribed continuous distribution, approximate a continuous distribution for the continuous variable; if the discrete variable is with a prescribed discrete distribution, transform a normally distributed variable that is underlying for continuous to a transformed continuous variable by simulating values of the normally distributed variable that is underlying for continuous and continuously mapping the normally distributed variable that is underlying for continuous to the prescribed discrete distribution based at least in part on the simulated values of the normally distributed variable that is underlying for continuous; transform a normally distributed variable that is underlying for discrete to a transformed discrete variable by simulating values of the normally distributed variable that is underlying for discrete and discrete mapping from the normally distributed variable that is underlying for discrete to one of the known discrete distribution and the approximated discrete distribution for the discrete variable based at least in part on the simulated values of the normally distributed variable that is underlying for discrete; and determine a polyserial correlation between the discrete variable and the continuous variable by using a stochastic root finding algorithm to compute a correlation between underlying normal distributions of the transformed discrete variable and one of the continuous variable having the approximated continuous distribution and the transformed continuous variable.

In another aspect, the disclosure is directed to a computer program product for determining a polyserial correlation between a discrete variable and a continuous variable, the computer program product comprising a computer readable storage medium having program code embodied therewith, the program code readable/executable by at least one processor to perform a method. The method may include if a discrete variable is without a known discrete distribution, approximating a discrete distribution for the discrete variable. The method may further include if a continuous variable is without a prescribed continuous distribution, approximating a continuous distribution for the continuous variable. The method may further include if the discrete variable is with a prescribed discrete distribution, transforming a normally distributed variable that is underlying for continuous to a transformed continuous variable by simulating values of the normally distributed variable that is underlying for continuous and continuously mapping the normally distributed variable that is underlying for continuous to the prescribed discrete distribution based at least in part on the simulated values of the normally distributed variable that is underlying for continuous. The method may further include transforming a normally distributed variable that is underlying for discrete to a transformed discrete variable by simulating values of the normally distributed variable that is underlying for discrete and discrete mapping from the normally distributed variable that is underlying for discrete to one of the known discrete distribution and the approximated discrete distribution for the discrete variable based at least in part on the simulated values of the normally distributed variable that is underlying for discrete. The method may further include determining a polyserial correlation between the discrete variable and the continuous variable by using a stochastic root finding algorithm to compute a correlation between underlying normal distributions of the transformed discrete variable and one of the continuous variable having the approximated continuous distribution and the transformed continuous variable.

The details of one or more aspects of the disclosure are set forth in the accompanying drawings and the description below. Other features, objects, and advantages of the disclosure will be apparent from the description and drawings, and from the claims.

DETAILED DESCRIPTION

In general, aspects of the disclosure are directed to determining polychoric and polyserial correlations between random variables using a normal to anything (NORTA) method to transform standard multivariate normal variables to variables with the desired marginal distributions and a Pearson correlation matrix. A polychoric correlation is a measure of bivariate association arising when both observed variates are ordered, categorical variables that result from polychotomizing two underlying continuous variables. A polyserial correlation is a measure of bivariate association arising when one observed variate is an ordered, categorical variable that results from polychotomizing one underlying continuous variable.

Current approaches to computing polychoric and polyserial correlations may include one or more drawbacks. For example, it may not always be clear when an observed discrete distribution has an underlying normal distribution. While some current approaches may include making the assumption that a discrete variable can be mapped from an underlying normal distribution into a simple categorical distribution with determined probabilities, the discrete variable may instead have a different distribution, such as a Poisson, binomial, or negative binomial distribution. Furthermore, current approaches computing polychoric correlations may include computing a cumulative density function for a bivariate normal distribution with a given correlation, which may include performing numerical integration, thereby possibly introducing significant computational errors. In addition, current approaches for computing polyserial correlation may include assuming that a continuous variable always has a normal distribution, which may not always be the case. Thus, there may be a need for new approaches to computing polychoric and polyserial correlations for real or simulated data.

Figure 1:
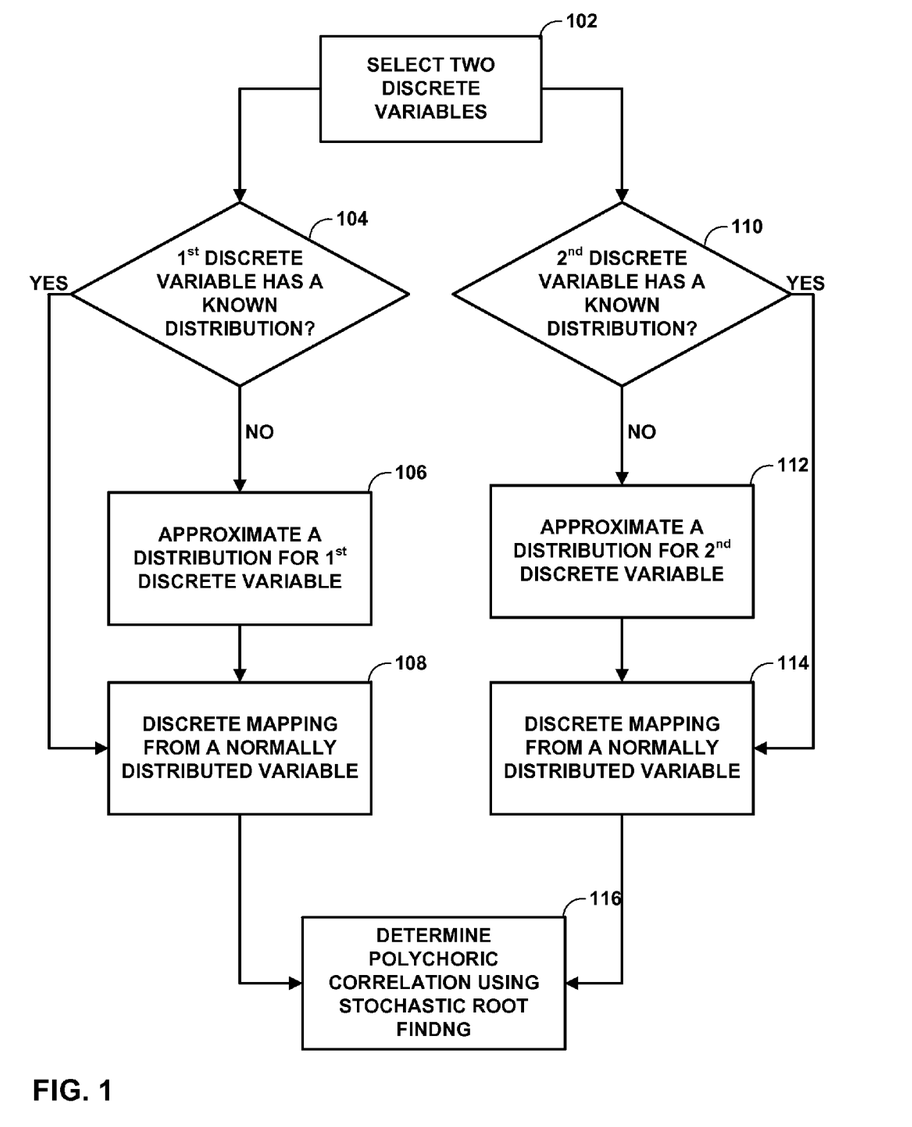
FIG. 1 is a flowchart illustrating a process for determining a polychoric correlation between two discrete random variables according to some aspects of the present disclosure.

FIG. 1 is a flowchart illustrating a process for determining a polychoric correlation between two discrete random variables according to some aspects of the present disclosure. The process may be performed on a computing device, such as the computing device shown in FIG. 3. As shown in FIG. 1, the process may include selecting two discrete random variables for determining the polychoric correlation between the two discrete random variables (102). The two discrete variables may have a given Pearson correlation and may also have corresponding underlying continuous variables that are assumed or determined to have bivariate normal distributions with correlation.

The process may further include determining if a first discrete random variable out of the two discrete random variables has a known distribution (104). If the first discrete variable is without a first known distribution, the process may further include approximating a first distribution for the first discrete variable (106). Approximating the first distribution may include assuming or determining that the first discrete variable has a categorical distribution, which is the empirical distribution for a discrete variable. Thus, the first discrete variable may be mapped from a normal distribution to a categorical distribution. Alternatively, distribution fitting may be used to find the best possible match for the first discrete variable out of possible discrete distributions based on real or simulated data for the first discrete variable. Distribution fitting is the fitting of a probability distribution to a series of data for the variable.

The process may further include determining if a second discrete random variable out of the two discrete random variables has a known distribution (110). If the second discrete variable is without a second known distribution, the process may further include approximating a second distribution for the second discrete variable (112). Similar to approximating the first distribution for the first discrete variable, approximating the second distribution may include assuming or determining that the second discrete variable has a categorical distribution, which is the empirical distribution for a discrete variable. Thus, the second discrete variable may be mapped from a normal distribution to a categorical distribution. Alternatively, distribution fitting may be used to find the best possible match for the second discrete variable out of possible discrete distributions based on real or simulated data for the second discrete variable.

The process may further include transforming a first normally distributed variable to a first transformed variable by simulating values of the first normally distributed variable and discrete mapping from the first normally distributed variable to the distribution for the first discrete variable based at least in part on the simulated values of the first normally distributed variable (108). The distribution for the first discrete variable may either be the known distribution for the first discrete variable or the approximated first distribution for the first discrete variable disclosed above.

The process may further include transforming a second normally distributed variable to a second transformed variable by simulating values of the second normally distributed variable and discrete mapping from the second normally distributed variable to the distribution for the second discrete variable based at least in part on the simulated values of the second normally distributed variable (114). The distribution for the second discrete variable may either be the known distribution for the second discrete variable or the approximated first distribution for the second discrete variable disclosed above.

Figure 3:
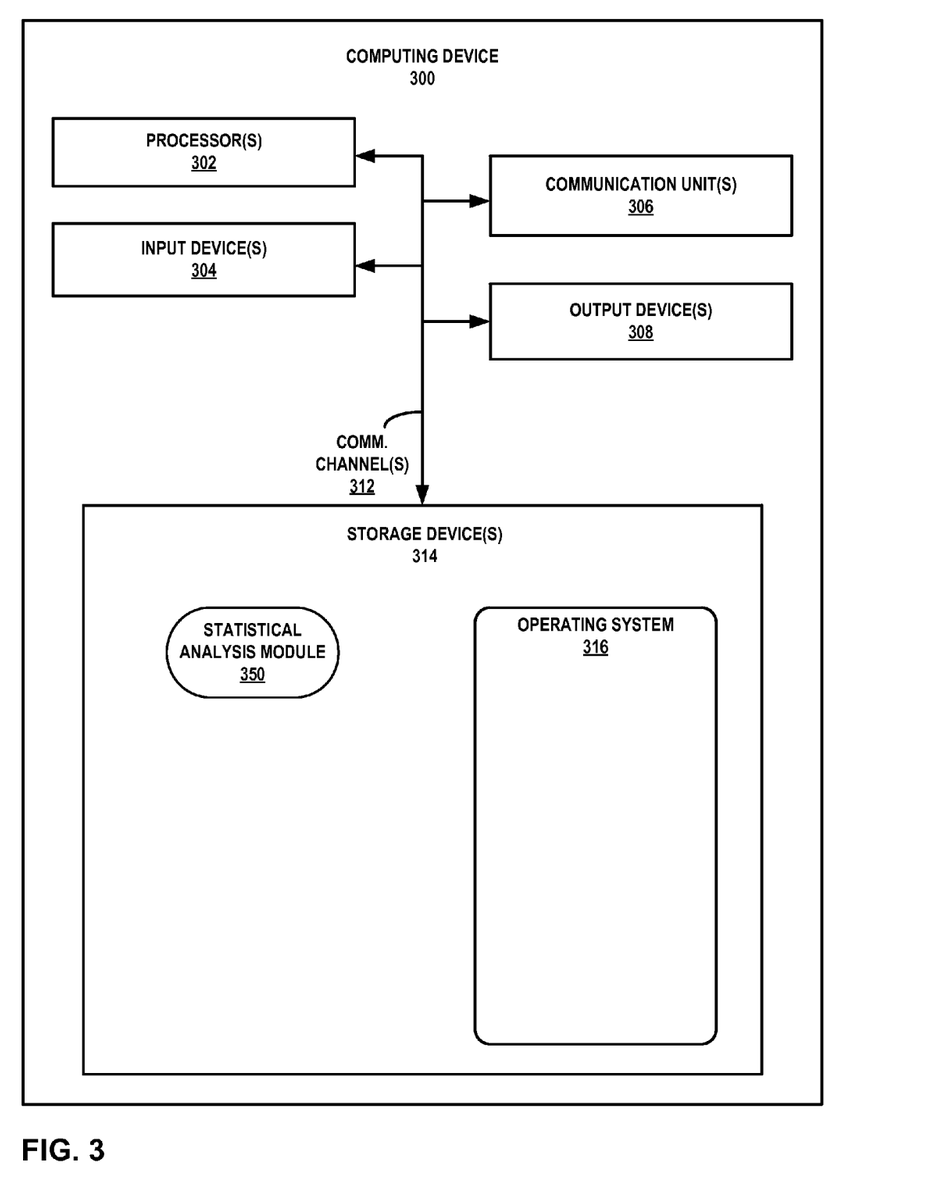
FIG. 3 is a block diagram illustrating a computing system according to some aspects of the present disclosure.

The normally distributed variables may be randomly generated by a computer system, such as shown in FIG. 3. Such a transformation by mapping from the first normally distributed variable to the distribution for the first discrete variable and from the second normally distributed variable to the distribution for the second discrete variable may be performed using a normal to anything (NORTA) method. Performing the NORTA method may include simulating a specified number of values of the correlated discrete normal variables having normal distributions and prescribed correlations via, for example, the Monte Carlo method, and may include transforming each of the variables into a variable with a prescribed distribution, such as described above with respect to steps 108 and 114. The normally distributed variables may be transformed by applying the composition of a cumulative distribution function (CDF) of the distributions for the first and second discrete variables, respectively, and the inverse of the CDF of a normal distribution, such that the variable with the prescribed distribution=CDF for the first or second discrete variable (inverse of the CDF of a normal distribution (variable with a standard normal distribution)).

The process may further include determining a polychoric correlation between the first discrete random variable and the second discrete random variable by using a stochastic root finding algorithm to operate on the first transformed variable and the second transformed variable (116). Given a correlation $p_{ij}$, a stochastic root finding algorithm may be used to find an approximate correlation $p^*_{ij}$ such that if standard bivariate normal variables and $Z_j$ have a Pearson's correlation $p^*_{ij}$ then after transforming and $Z_j$ to $X_i$ and $X_j$ the Pearson correlation between $X_i$ and $X_j$ is closer to $p_{ij}$. The approximate correlation $p^*_{ij}$ may be the polychoric correlation between the first discrete variable and the second discrete variable. Thus, the stochastic root finding algorithm may find the correlation between the underlying normal distribution for the first transformed variable and the second transformed variable, and that correlation may be the same as the polychoric correlation between the first discrete random variable and the second discrete random variable.

Figure 2:
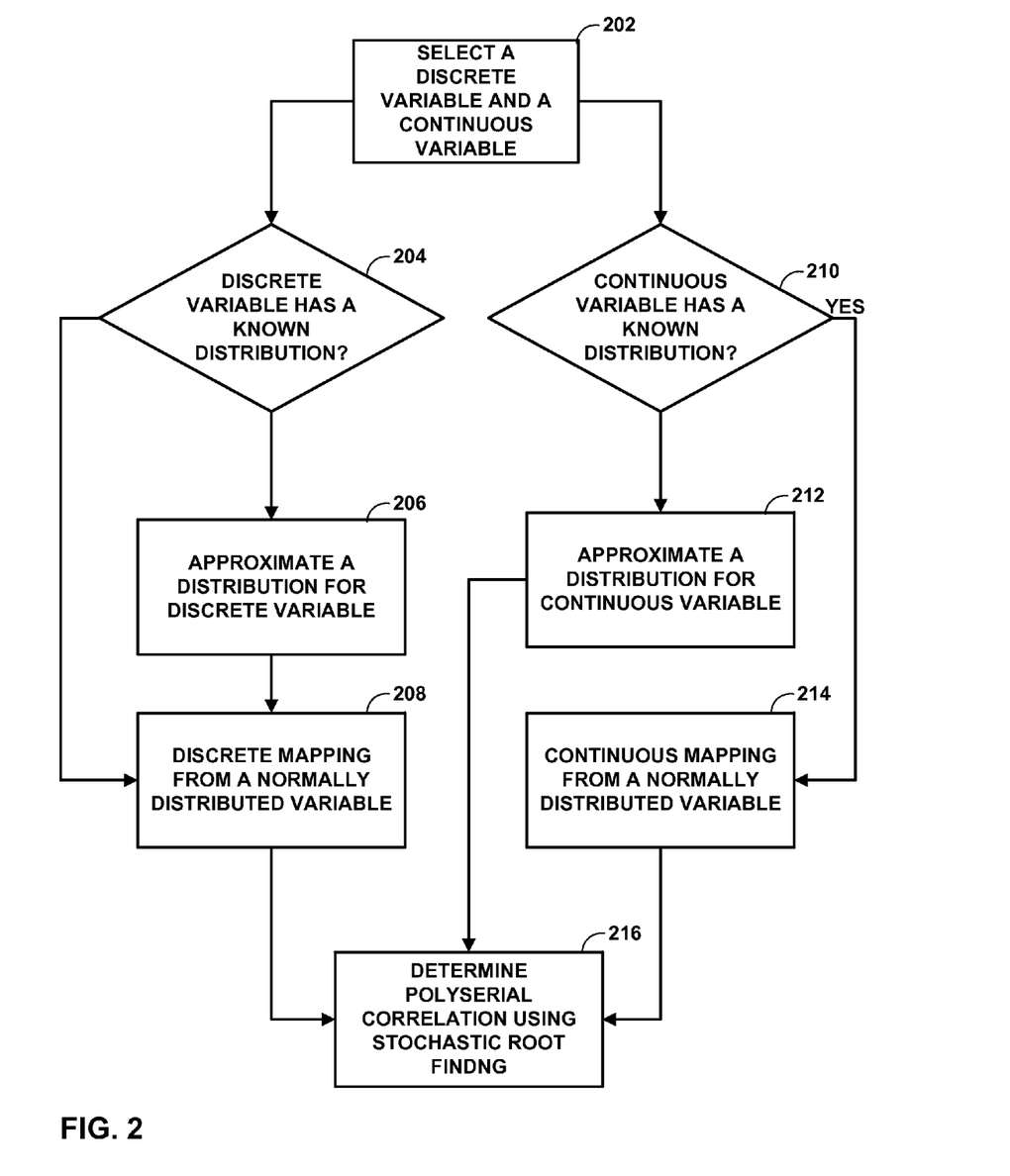
FIG. 2 is a flowchart illustrating a process for determining a polyserial correlation between a discrete random variable and a continuous random variable according to some aspects of the present disclosure.

FIG. 2 is a flowchart illustrating a process for determining a polyserial correlation between a discrete random variable and a continuous random variable according to some aspects of the present disclosure. The process may be performed on a computing device, such as the computing device shown in FIG. 3. As shown in FIG. 2, the process may include selecting a discrete random variable and a continuous random variable for determining the polyserial correlation between the two random variables (202). The discrete random variable and the continuous random variable may have a given Pearson correlation. The discrete random variable and the continuous random variable may also have an underlying continuous variable and an underlying real continuous variable, respectively, that are assumed or determined to have a joint bivariate normal distribution with correlation.

The process may further include determining if the discrete random variable has a known distribution (204). If the discrete random variable is without a known distribution, the process may further include approximating a distribution for the discrete random variable (206). Approximating the distribution for the discrete random variable may include assuming or determining that the discrete variable has a categorical distribution, which is the empirical distribution for a discrete variable. Thus, the discrete random variable may be mapped from a normal distribution to a categorical distribution. Alternatively, distribution fitting may be used to find the best possible match for the discrete random variable out of possible discrete distributions based on real or simulated data for the discrete random variable.

The process may further include determining if the continuous random variable has a known distribution (210). For example, the continuous random variable may have a known distribution if it is a simulated predictor, but may not have a known distribution if it is a scored target of simulated predictors. If the continuous random variable is without a known distribution, the process may further include approximating a continuous distribution for the continuous random variable (212). Approximating the continuation distribution for the continuous random variable may include determining that the continuous random variable has a normal distribution. In that case, the process may include approximating a continuous normal distribution for the continuous random variable. Approximating the continuous normal distribution may include applying a linear function to a standard normal distribution. Alternatively, the process may include using distribution fitting to find the best possible match for the continuous random variable out of possible continuous distributions based on real or simulated data for the continuous random variable. If the continuous random variable is with a known distribution, the process may further include transforming a normally distributed variable that is underlying for continuous to a transformed continuous variable by simulating values of the normally distributed variable that is underlying for continuous and continuously mapping the normally distributed variable that is underlying for continuous to the prescribed discrete distribution using the NORTA method and based on the simulated values of the normally distributed variable that is underlying for continuous s (214). As discussed above, simulating values of the normally distributed variables may include performing a Monte Carlo simulation to simulate the values.

The process may further include determining a polyserial correlation between the discrete random variable and the continuous random variable by using a stochastic root finding algorithm to operate on the transformed discrete random variable and one of the continuous random variable having the approximated continuous distribution and the transformed continuous random variable (216). Because the approximated continuous distribution is approximated to be a normal distribution, additional mapping, such as shown in step 214, may not be necessary for the approximated continuous distribution.

As discussed above, given a correlation $p_{ij}$, a stochastic root finding algorithm may be used to find an approximate correlation $p^*_{ij}$ such that if standard bivariate normal variables and $Z_j$ have a Pearson's correlation $p^*_{ij}$ then after transforming $Z_i$ and $Z_j$ to $X_i$ and $X_j$ the Pearson correlation between $X_i$ and $X_j$ is closer to $p_{ij}$. The approximate correlation $p^*_{ij}$ may be the polychoric correlation between the first discrete variable and the second discrete variable. Thus, the stochastic root finding algorithm may find the correlation between the underlying normal distribution for the transformed discrete random variable and one of the continuous random variable having the approximated continuous distribution and the transformed continuous random variable, and that correlation may be the same as the polychoric correlation between the discrete random variable and the continuous random variable.

FIG. 3 is a block diagram illustrating a computing system according to some aspects of the present disclosure. Computing system 300 may be one example of a computing system that determines polychoric and polyserial correlations. In other examples, computing device 300 can include fewer, additional, or different components compared to those illustrated in FIG. 3. As shown in the example of FIG. 3, computing device 300 may include one or more processors 302, one or more input devices 304, one or more communication units 306, one or more output devices 308, and one or more storage devices 314. In this example, storage devices 314 of computing device 300 may include operating system 316 and statistical analysis module 350. Communication channels 312 may interconnect each of the components 302, 304, 306, 308, and 314 for inter-component communications (physically, communicatively, and/or operatively). In some examples, communication channels 312 may include a system bus, a network connection, an inter-process communication data structure, or any other method for communicating data.

One or more input devices 304 of computing device 300 may receive input. Examples of input are tactile, audio, and video input. Input devices 304 of computing device 300, in one example, include a presence-sensitive display, touch-sensitive screen, mouse, keyboard, voice responsive system, video camera, microphone or any other type of device for detecting input from a human or machine.

One or more output devices 308 of computing device 300 may generate output. Examples of output are tactile, audio, and video output. Output devices 308 of computing device 300, in one example, include a presence-sensitive display, sound card, video graphics adapter card, speaker, cathode ray tube (CRT) monitor, liquid crystal display (LCD), or any other type of device for generating output to a human or machine.

One or more communication units 306 of computing device 300 may communicate with wired or wireless external devices via one or more networks by transmitting and/or receiving network signals on the one or more networks. For example, computing device 300 may use communication units 306 to transmit and/or receive radio signals on a radio network such as a cellular radio network. Likewise, communication units 306 may transmit and/or receive satellite signals on a satellite network such as a GPS network. Examples of communication units 306 include a network interface card (e.g. such as an Ethernet card), an optical transceiver, a radio frequency transceiver, a GPS receiver, or any other type of device that can send and/or receive information. Other examples of communication units 306 may include Bluetooth®, GPS, 3G, 4G, and Wi-Fi® radios found in mobile devices as well as Universal Serial Bus (USB) controllers.

One or more storage devices 314 within computing device 300 may store information required for use during operation of computing device 300. Storage devices 314, in some examples, have the primary purpose of being short term and not long-term computer-readable storage mediums. Storage devices 314 on computing device 300 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 314 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 314 may store program instructions and/or data associated with statistical analysis module 350.

One or more processors 302 may implement functionality and/or execute instructions within computing device 300. For example, processors 302 on computing device 300 may read and execute instructions stored by storage devices 314 that execute the functionality of statistical analysis module 350. These instructions executed by processors 302 may cause computing device 300 to store information within storage devices 314 during program execution. Processors 302 may execute statistical analysis module 550 to perform various actions.

Statistical analysis module 550 may determine a polychoric correlation between two discrete random variables according to the process describe above with respect to FIG. 1. Statistical analysis module 550 may select two discrete random variables and may simulate data for one or more of the two selected discrete random variables. Statistical analysis module 550 may also receive any real data for one or more of the two selected discrete random variables. If one or both of the discrete random variables do not have a known distribution, statistical analysis module 550 may approximate a distribution for each of the discrete variables that do not have a known distribution. Statistical analysis module 550 may use the NORTA method to transform normally distributed variables into the distributions of the two selected discrete variables, and may use stochastic root finding to determine the approximate correlation for the underlying normally distributed variables of the transformed variables. The determined approximate correlation for the underlying normally distributed variables may be the polychoric correlation for the two discrete random variables.

Statistical analysis module 550 may also determine a polyserial correlation between a discrete random variable and a continuous random variable with respect to FIG. 2. Statistical analysis module 550 may select a discrete random variable and a continuous random variable and may simulate data for one or more of the two selected variables. Statistical analysis module 550 may also receive any real data for one or more of the two selected variables. If the selected discrete random variable does not have a known distribution, statistical analysis module 550 may approximate a distribution for the selected discrete random variable.

Similarly, if the selected continuous random variable does not have a known distribution, statistical analysis module 550 may also approximate a distribution for the selected random variable. If the continuous random variable does have a known distribution, statistical analysis module 550 may transform a normally distributed variable that is underlying for continuous to a transformed continuous variable by continuously mapping the normally distributed variable that is underlying for continuous to the prescribed discrete distribution for the continuous random variable using the NORTA method. The statistical analysis module 550 may using a stochastic root finding algorithm to operate on the transformed discrete random variable and, depending on whether the continuous random variable has a known distribution, either the continuous random variable having the approximated continuous distribution or the transformed continuous random variable to determine the approximate correlation of the underlying normally distributed variables. Such approximate correlation may be the polyserial correlation between the discrete random variable and the continuous random variable.

As will be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various aspects of the disclosure have been described. These and other aspects are within the scope of the following claims.

The invention claimed is:

1. A computer system for determining a polychoric correlation between a first discrete variable and a second discrete variable, the computer system comprising:
   one or more processors;
   one or more computer-readable memories;
   one or more computer-readable tangible storage devices;
   program instructions stored on at least one of the one or more computer-readable tangible storage devices for execution by at least one of the one or more processors via at least one of the one or more computer-readable memories to:
   if a first discrete variable is without a first known distribution, approximate a first distribution for the first discrete variable;
   if a second discrete variable is without a second known distribution, approximate a second distribution for the second discrete variable;
   transform a first normally distributed variable to a first transformed variable by simulating values of the first normally distributed variable and discrete mapping from the first normally distributed variable to one of the first known distribution and the approximated first distribution for the first discrete variable based at least in part on the simulated values of the first normally distributed variable;
   transform a second normally distributed variable to a second transformed variable by simulating values of the second normally distributed variable and discrete mapping from the second normally distributed variable to one of the second known distribution and the approximated second distribution for the second discrete variable based at least in part on the simulated values of the second normally distributed variable; and
   determine a polychoric correlation between the first discrete variable and the second discrete variable by using a stochastic root finding algorithm to operate on the first transformed variable and the second transformed variable.

2. The computer system of claim 1, wherein approximate the first distribution for the first discrete variable further comprises:
   approximate an empirical distribution function for the first discrete variable.

3. The computer system of claim 1, wherein approximate the first distribution for the first discrete variable further comprises:
   perform distribution fitting of possible discrete distributions on the first discrete variable.

4. The computer system of claim 1, wherein approximate the second distribution for the second discrete variable further comprises:
   perform an empirical distribution function for the second discrete variable.

5. The computer system of claim 1, wherein approximate the second distribution for the second discrete variable further comprises:
   perform distribution fitting of possible discrete distributions on the second discrete variable.

6. A computer program product for determining a polychoric correlation between a first discrete variable and a second discrete variable, the computer program product comprising a computer readable storage medium having program code embodied therewith, the program code readable/executable by at least one processor to perform a method comprising:
   if a first discrete variable is without a first known distribution, approximating a first distribution for the first discrete variable;
   if a second discrete variable is without a second known distribution, approximating a second distribution for the second discrete variable;
   transforming a first normally distributed variable to a first transformed variable by simulating values of the first normally distributed variable and discrete mapping from the first normally distributed variable to one of the first known distribution and the approximated first distribution for the first discrete variable based at least in part on the simulated values of the first normally distributed variable;

transforming a second normally distributed variable to a second transformed variable by simulating values of the second normally distributed variable and discrete mapping from the second normally distributed variable to one of the second known distribution and the approximated second distribution for the second discrete variable based at least in part on the simulated values of the second normally distributed variable; and determining a polychoric correlation between the first discrete variable and the second discrete variable by using a stochastic root finding algorithm to operate on the first transformed variable and the second transformed variable.

7. The computer program product of claim 6, wherein approximating the first distribution for the first discrete variable further comprises:

approximating an empirical distribution function for the first discrete variable.

8. The computer program product of claim 6, wherein approximating the first distribution for the first discrete variable further comprises:

performing distribution fitting of possible discrete distributions on the first discrete variable.

9. The computer program product of claim 6, wherein approximating the second distribution for the second discrete variable further comprises:

approximating an empirical distribution function for the second discrete variable.

10. The computer program product of claim 6, wherein approximating the second distribution for the second discrete variable further comprises:

performing distribution fitting of possible discrete distributions on the second discrete variable.

\* \* \* \* \*